US012212249B1

United States Patent
Qiu et al.

(10) Patent No.: US 12,212,249 B1
(45) Date of Patent: Jan. 28, 2025

(54) TWO-STEP INVERTER FOR WIRELESS POWER APPLICATIONS

(71) Applicant: Apple Inc., Cupertino, CA (US)

(72) Inventors: Weihong Qiu, San Ramon, CA (US); Jun Liu, Pleasanton, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 236 days.

(21) Appl. No.: 18/065,777

(22) Filed: Dec. 14, 2022

Related U.S. Application Data

(60) Provisional application No. 63/376,182, filed on Sep. 19, 2022.

(51) Int. Cl.
*H02M 7/483* (2007.01)
*H02J 50/12* (2016.01)
*H02M 1/00* (2006.01)
*H02M 7/5387* (2007.01)
*H02M 1/38* (2007.01)

(52) U.S. Cl.
CPC .......... *H02M 7/4837* (2021.05); *H02J 50/12* (2016.02); *H02M 1/0095* (2021.05); *H02M 7/5387* (2013.01); *H02M 1/0058* (2021.05); *H02M 1/38* (2013.01)

(58) Field of Classification Search
CPC ............. H02M 7/4837; H02M 1/0095; H02M 7/5387; H02M 1/0058; H02M 1/38; H02J 50/12
See application file for complete search history.

(56) References Cited

U.S. PATENT DOCUMENTS

| | | | | |
|---|---|---|---|---|
| 10,804,798 | B1* | 10/2020 | Rizzolatti | H02M 3/33573 |
| 11,736,012 | B2* | 8/2023 | Huh | H02M 3/1582 |
| | | | | 323/234 |
| 2012/0218795 | A1* | 8/2012 | Mihalache | H02M 7/487 |
| | | | | 363/131 |

FOREIGN PATENT DOCUMENTS

EP 3174190 A1 5/2017

* cited by examiner

*Primary Examiner* — Kyle J Moody
(74) *Attorney, Agent, or Firm* — FLETCHER YODER PC

(57) ABSTRACT

A switched capacitor converter can include a switched capacitor stage comprising a flying capacitor and a ladder of three switching devices. A first switching device can be connected between a DC input of the switched capacitor converter and an AC bus. A second switching device is connected between the DC input and a third switching device. The third switching device can be connected between the second switching device and ground. The flying capacitor can be connected between the AC bus and a junction of the second switching device and the third switching device. The switched capacitor converter can further include an inverter stage having an input coupled to the AC bus and an output that delivers an AC voltage.

28 Claims, 7 Drawing Sheets

TWO-STEP INVERTER FOR WIRELESS POWER APPLICATIONS

CROSS-REFERENCE TO RELATED APPLICATIONS

This application claims priority to U.S. Provisional Application No. 63/376,182, filed Sep. 19, 2022, entitled "TWO-STEP INVERTER FOR WIRELESS POWER APPLICATIONS," the disclosure of which is incorporated by reference in its entirety.

BACKGROUND

Some wireless power transfer transmitters employ an input DC/DC converter stage, like boost, buck, or buck-boost, to vary the DC bus voltage provided to an inverter of the wireless power transmitter. Varying the power delivered by such wireless power transmitters can be accomplished by varying the output voltage produced by the DC/DC converter (and thus the DC bus voltage of the inverter). In some cases, the inductor of the DC/DC converter stage and the DC bus capacitor that supports the converter output/inverter DC bus can be undesirably large.

SUMMARY

Thus, inverter configurations for wireless power transmitters that allow for elimination of the inductor in the DC/DC converter may be desirable. In some cases, the DC/DC converter stage can be replaced with one or more switched/flying capacitor stage that still allow for regulating output power delivered by the inverter/wireless power transmitter. The switched capacitor converter and the inverter can be merged to one integrated stage. In at least some applications, such an arrangement can use the high efficiency and high power density of a switched capacitor converter to achieve better system efficiency with reduced PCB area.

A switched capacitor converter can include a switched capacitor stage comprising a flying capacitor and a ladder of three switching devices. A first switching device can be connected between a DC input of the switched capacitor converter and an AC bus. A second switching device is connected between the DC input and a third switching device. The third switching device can be connected between the second switching device and ground. The flying capacitor can be connected between the AC bus and a junction of the second switching device and the third switching device. The switched capacitor converter can further include an inverter stage having an input coupled to the AC bus and an output that delivers an AC voltage.

The switched capacitor converter can further include control circuitry that operates the switched capacitor stage to alternate between a parallel mode, in which the flying capacitor is connected in parallel with the DC input by closing the first and third switching devices and opening the second switching device, thereby supplying an input voltage received at the DC input to the inverter stage via the AC bus; and a series mode in which the flying capacitor is connected in series with the DC input by opening the first and third switches and closing the second switching device, thereby supplying twice the input voltage received at the DC input to the inverter stage via the AC bus. The control circuitry can switch between the parallel mode and the series mode at a frequency twice the switching frequency of the inverter stage. The control circuitry can vary a duty cycle between the parallel mode and the series mode to regulate an output voltage or current of the inverter stage. The control circuitry can vary a phase shift between switching of the switched capacitor stage and switching of the inverter stage to control timing and positioning inverter stage output voltage levels.

The switched capacitor stage can further include first and second switched capacitor stages, the first switched capacitor stage being coupled to a first AC bus and the second switched capacitor stage being coupled to the second AC bus. The inverter stage can include a full bridge inverter having a first leg coupled to the first AC bus and a second leg coupled to the second AC bus. The switched capacitor converter can further include control circuitry that operates the first and second switched capacitor stages to alternate between: a parallel mode in which a respective flying capacitor is connected in parallel with the DC input by closing corresponding first and third switching devices and opening a corresponding second switching device, thereby supplying an input voltage received at the DC input to the inverter stage via a respective AC bus; and a series mode in which a respective flying capacitor is connected in series with the DC input by opening corresponding first and third switches and closing a corresponding second switching device, thereby supplying twice the input voltage received at the DC input to the inverter stage via a respective AC bus. The first switched capacitor stage can be in the series mode when the second switched capacitor stage is in the parallel mode, and the second switched capacitor stage can be in the series mode when the first switched capacitor stage is in the parallel mode. The control circuitry can switch the first and second switching stages between the parallel mode and the series mode at a frequency equal to the switching frequency of the inverter stage. The control circuitry can vary a duty cycle between the parallel mode and the series mode to regulate an output voltage or current of the inverter stage. The control circuitry can vary a phase shift between switching of the switched capacitor stage and switching of the inverter stage to control timing and positioning inverter stage output voltage levels.

The switched capacitor stage can further include a first switched capacitor stage and a second switched capacitor stage, each of the first and second switched capacitor stages further including an additional switching device selectively coupling a respective flying capacitor and a respective first switching device to the AC bus. The switched capacitor converter can further include control circuitry that operates the first and second switched capacitor stages to alternate between: a parallel mode in which a respective flying capacitor is connected in parallel with the DC input by closing corresponding first and third switching devices and opening a corresponding second switching device, thereby supplying an input voltage received at the DC input to the inverter stage via a respective AC bus; and a series mode in which a respective flying capacitor is connected in series with the DC input by opening corresponding first and third switches and closing a corresponding second switching device, thereby supplying twice the input voltage received at the DC input to the inverter stage via a respective AC bus. The first switched capacitor stage can be in the series mode when the second switched capacitor stage is in the parallel mode, and the second switched capacitor stage is in the series mode when the first switched capacitor stage is in the parallel mode. The control circuitry can switch the first and second switched capacitor stages between the parallel mode and the series mode at a frequency independent from the switching frequency of the inverter stage. The switching frequency of the switched capacitor stages can be greater than the switching frequency of the inverter stage. The control circuitry can vary a duty cycle between the parallel mode and the series mode to regulate an output voltage or current of the inverter stage. The control circuitry can vary a phase shift between switching of the switched capacitor stage and switching of the inverter stage to control timing and positioning inverter stage output voltage levels.

A switched capacitor converter can include a first switched capacitor stage further that further includes a first flying capacitor and a ladder of three switching devices. A first switching device of the first flying capacitor stage can be connected between a DC input of the switched capacitor converter and a first AC bus. A second switching device of the first flying capacitor stage can be connected between the DC input and a third switching device of the first flying capacitor stage. The third switching device of the first switched capacitor stage can be connected between the second switching device of the first switched capacitor stage and ground. The first flying capacitor can be connected between the first AC bus and a junction of the second switching device of the first flying capacitor stage and the third switching device of the first flying capacitor stage. A second switched capacitor stage can further include a second flying capacitor and a ladder of three switching devices. A first switching device of the second flying capacitor stage is connected between a DC input of the switched capacitor converter and a second AC bus. A second switching device of the second flying capacitor stage can be connected between the DC input and a third switching device of the second flying capacitor stage. The third switching device of the second switched capacitor stage can be connected between the second switching device of the second switched capacitor stage and ground. The second flying capacitor can be connected between the second AC bus and a junction of the second switching device of the second switched capacitor stage and the third switching device of the second switched capacitor stage. The switched capacitor converter can also include an inverter stage further comprising a full bridge inverter having a first leg coupled to the first AC bus and a second leg coupled to the second AC bus and an output that delivers an AC voltage.

The switched capacitor converter can further include control circuitry that operates the first and second switched capacitor stages to alternate between: a parallel mode in which a respective flying capacitor is connected in parallel with the DC input by closing corresponding first and third switching devices and opening a corresponding second switching device, thereby supplying an input voltage received at the DC input to the inverter stage via a respective AC bus; and a series mode in which a respective flying capacitor is connected in series with the DC input by opening corresponding first and third switches and closing a corresponding second switching device, thereby supplying twice the input voltage received at the DC input to the inverter stage via a respective AC bus. The first switched capacitor stage can be in the series mode when the second switched capacitor stage is in the parallel mode, and the second switched capacitor stage can be in the series mode when the first switched capacitor stage is in the parallel mode. The control circuitry can switch the first and second switching stages between the parallel mode and the series mode at a frequency equal to the switching frequency of the inverter stage. The control circuitry can vary a duty cycle between the parallel mode and the series mode to regulate an output voltage or current of the inverter stage. The control circuitry can vary a phase shift between switching of the switched capacitor stage and switching of the inverter stage to control timing and positioning inverter stage output voltage levels.

A switched capacitor converter can include a first switched capacitor stage and a second switched capacitor stage. The first switched capacitor stage can include a first flying capacitor and a ladder of four switching device. A first switching device of the first flying capacitor stage can be connected between first terminal of the first flying capacitor and a second switching device of the first flying capacitor stage. The second switching device of the first flying capacitor stage can be coupled between the first terminal of the first flying capacitor and a DC input of the switched capacitor converter. A third switching device of the first flying capacitor stage can be coupled between the DC input of the switched capacitor converter and a second terminal of the first flying capacitor. A fourth switching device of the first flying capacitor stage can be coupled between the third switching device of the first flying capacitor stage and ground. The second switched capacitor stage can include a second flying capacitor and a ladder of four switching devices. The first switching device of the second flying capacitor stage can be connected between first terminal of the second flying capacitor and a second switching device of the second flying capacitor stage. The second switching device of the second flying capacitor stage can be coupled between the first terminal of the second flying capacitor and the DC input of the switched capacitor converter. A third switching device of the second flying capacitor stage can be coupled between the DC input of the switched capacitor converter and a second terminal of the second flying capacitor. A fourth switching device of the second flying capacitor stage can be coupled between the third switching device of the second flying capacitor stage and ground. The switched capacitor converter can further include an inverter stage having an input coupled to the AC bus and an output that delivers an AC voltage.

The switched capacitor converter can still further include control circuitry that operates the first and second switched capacitor stages to alternate between a parallel mode in which a respective flying capacitor is connected in parallel with the DC input by closing corresponding first and third switching devices and opening a corresponding second switching device, thereby supplying an input voltage received at the DC input to the inverter stage via a respective AC bus; and a series mode in which a respective flying capacitor is connected in series with the DC input by opening corresponding first and third switches and closing a corresponding second switching device, thereby supplying twice the input voltage received at the DC input to the inverter stage via a respective AC bus. The first switched capacitor stage can be in the series mode when the second switched capacitor stage is in the parallel mode, and the second switched capacitor stage can be in the series mode when the first switched capacitor stage is in the parallel mode. The control circuitry can switch the first and second switched capacitor stages between the parallel mode and the series mode at a frequency independent from the switching frequency of the inverter stage. The switching frequency of the switched capacitor stages can be greater than the switching frequency of the inverter stage. The control circuitry can vary a duty cycle between the parallel mode and the series mode to regulate an output voltage or current of the inverter stage. The control circuitry can vary a phase shift between switching of the switched capacitor stage and switching of the inverter stage to control timing and positioning inverter stage output voltage levels.

A wireless power transmitter can include a switched capacitor converter according to any of the embodiments described above, wherein the output of the inverter stage can be coupled to a wireless power transmitter coil.

DETAILED DESCRIPTION

Figure 1:
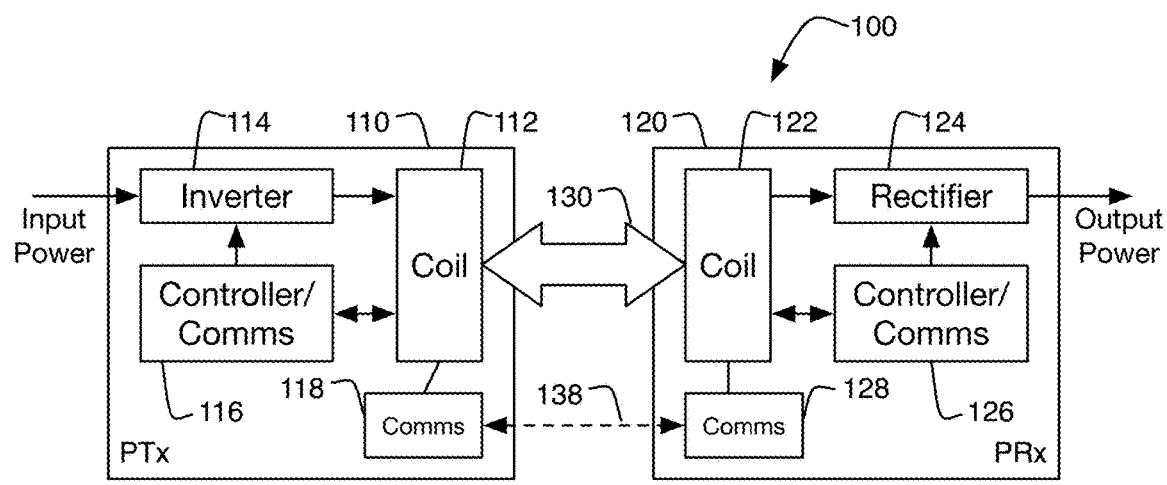
FIG. 1 illustrates a simplified block diagram of a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that transfers power to a power receiver (PRx) 120 wirelessly, such as via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board or flat coil windings. Other arrangements are also possible and may be used in conjunction with the various embodiments described herein. The wireless transmitter coil may also include a core or a flat layer of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and/or tuning capacitor and use information derived therefrom to control the inverter 114 as appropriate for a given situation. For example, controller/communications module may be configured to control inverter 114 to operate at a given frequency and/or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation-based communications from the PRx. In either case, the controller/communications module 126 may be configured to vary the current drawn on the receiver side to manipulate the waveform seen on the Tx coil to deliver information from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board or flat coil windings. Other arrangements are also possible and may be used in conjunction with the various embodiments described herein. The wireless receiver coil may also include a core or flat layer of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to provide a given output voltage depending on the particular application. In some embodiments, the controller/communications module may be configured to send information to the PTx device to effectively control the power delivered to the receiver. This information may be received sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation-based communications from the PRx. In either case, the controller/communications module 126 may be configured to vary the current drawn on the receiver side to manipulate the waveform seen on the Tx coil to deliver information from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry. PRx device 120 may optionally include other systems and components, such as a communications ("comms") module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above-described wireless power transmission system 100 are possible, and the following teachings are applicable to any of such variations and enhancements.

Figure 2:
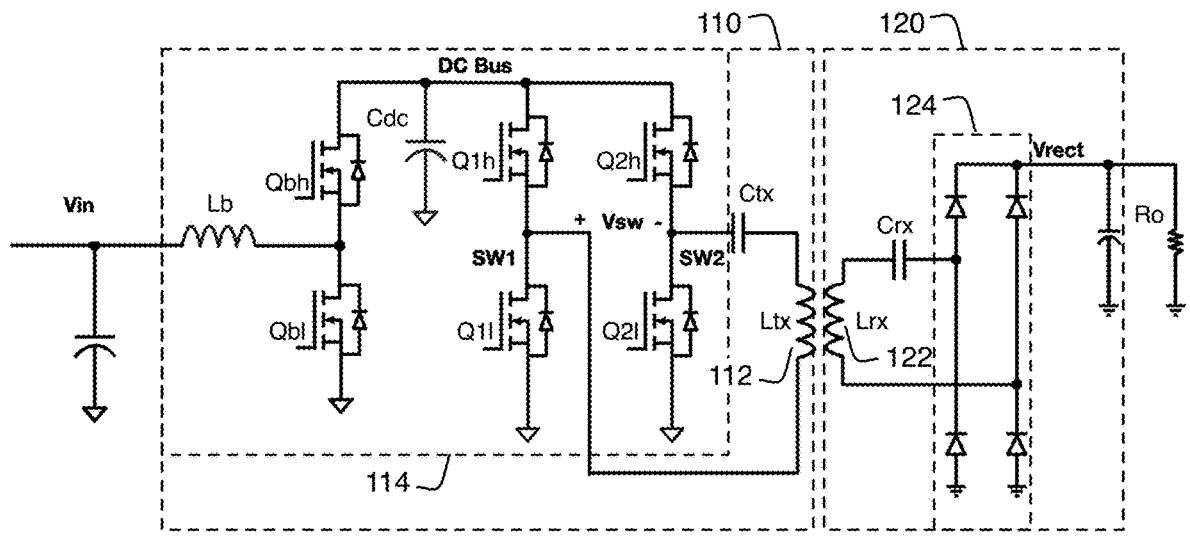
FIG. 2 illustrates a simplified schematic of a wireless power transfer system with a boost converter as pre-regulator stage.

FIG. 2 illustrates a simplified schematic of a wireless power transfer system. An input voltage Vin may be supplied to the power transmitter 110, which may be supplied at a variety of different voltages. For example, the input voltage can come from a USB (Universal Serial Bus) provided DC bus at 5V or another voltage, e.g., the various voltages provided by USB-PD (Universal Serial Bus Power Delivery systems). This DC voltage may be input into a boost converter, made up of boost inductor Lb, boost switch Qbl, and synchronous rectifier switch Qbh. In other embodiments, a passive diode could be used for the rectifier component. The boost converter can increase the input voltage Vin to a higher level for the main DC bus. This DC bus may be supported by capacitor Cdc. In some applications, the power delivered by the wireless power transfer system can be regulated by causing the boost converter to increase or decrease the DC bus voltage, thereby increasing or decreasing the power delivered.

The DC bus voltage can be provided to inverter 114, illustrated as a full-bridge inverter made up of switches Q1$h$, Q1$l$, Q2$h$, and Q2$l$. The inverter's DC input terminals are the drain side of high side switches Q1$h$ and Q2$h$ and the source side of low side switches Q1$l$ and Q2$l$. The inverter's AC output terminals are the Q1$h$ to Q1$l$ connection point SW1 and the Q2$h$ to Q2$l$ connection point SW2. By alternately turning on switch pair Q1$h$ and Q2$l$ or switch pair Q1$l$ and Q2$h$, the DC bus voltage can be applied with alternating polarity (Vsw) across the wireless power transmit coil 112, represented by inductor Ltx (in series with tuning capacitor Ctx). Elsewhere in this description, the voltages appearing at terminals SW1 and SW2 relative to ground and the voltage difference between the voltages appearing at terminals SW1 and SW2 (i.e., the voltage of these terminals relative to each other) are described and illustrated to further explain operation of the various inverter topologies and modes.

Turning to PRx 120, as noted above, current flowing through PTx coil 112 (Ltx) can induce a corresponding current in magnetically coupled PRx coil 122 (Lrx). This current can flow (via tuning capacitor Crx) through rectifier 124 to power a load Ro. Rectifier 124 is illustrated as a passive diode bridge but could also be an active rectifier made up of controlled switching devices. Viewed another way, the rectified output voltage Vrect may power a load Ro. The output may also include the illustrated filter capacitor.

The above-described schematic is provided as an illustrative example. Other variations of the circuitry could also be used in conjunction with the various embodiments that are described in greater detail below. One issue that can arise with the illustrated configuration (and similar configurations) is that boost inductor Lb can be physically large and relatively expensive. Additionally, operation of the boost converter can introduce inefficiencies into the system. Also, the boost converter may be relatively slow to respond, which may lead to decreased performance, for example with respect to demodulating in-band communications. Thus, alternative PRx/inverter configurations that can ameliorate one or more of these effects may be preferable for some embodiments.

Figure 3:
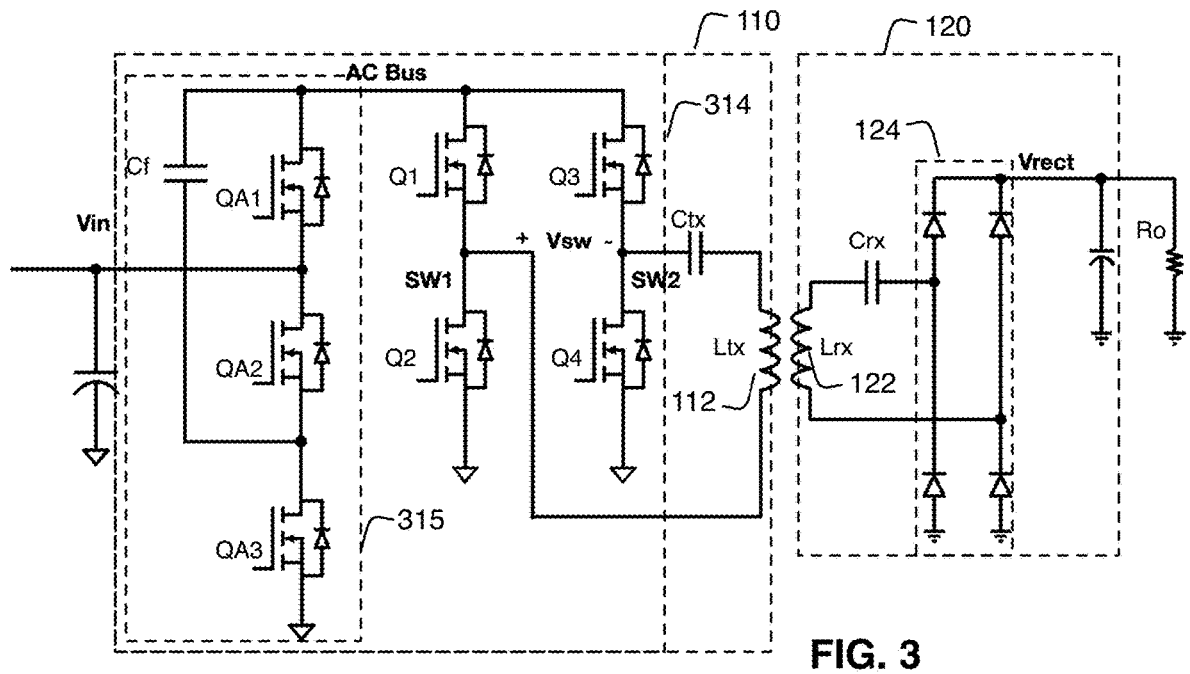
FIG. 3 illustrates a simplified schematic of a wireless power transfer system with one embodiment of a two-step inverter.

FIG. 3 illustrates a simplified schematic of a wireless power transfer system with one embodiment of a two-step inverter 314. Two-step inverter 314 includes a full-bridge inverter made up of switches Q1-Q4, like that discussed above with respect to FIG. 2. However, the boost converter stage is replaced with a switched capacitor stage 315 made up of switches QA1-QA3 and flying capacitor Cf. Operation of this circuitry is described in greater detail below, but generally includes operating the switched capacitor stage at a switching frequency that is twice the inverter switching frequency and adjusting the duty cycle of the step pulse on the output AC bus (i.e., the duty cycle of the switching converter) to regulate the transferred power. Use of this configuration can allow for elimination of boost inductor Lb, as well as elimination of the DC bus capacitor Cdc. Additionally, the switched capacitor stage can omit the uppermost switch found in a conventional switched capacitor/charge pump type converter, meaning that the input bus to the full bridge inverter stage can be an AC bus, rather than a DC bus.

The configuration of FIG. 3 can have various advantages as compared to the configuration of FIG. 2. Elimination of the boost inductor and DC bus capacitor can reduce both size and cost of PTx 110. Additionally, a switched capacitor converter can have a higher operating efficiency than a boost converter, leading to higher overall system efficiency. Additionally, the illustrated configuration may be operated or controlled to reduce interference with in-band communications and exhibit better electromagnetic interference (EMI) performance. For example, improved EMI performance can come from the smaller voltage transitions described in greater detail below.

Figure 4A:
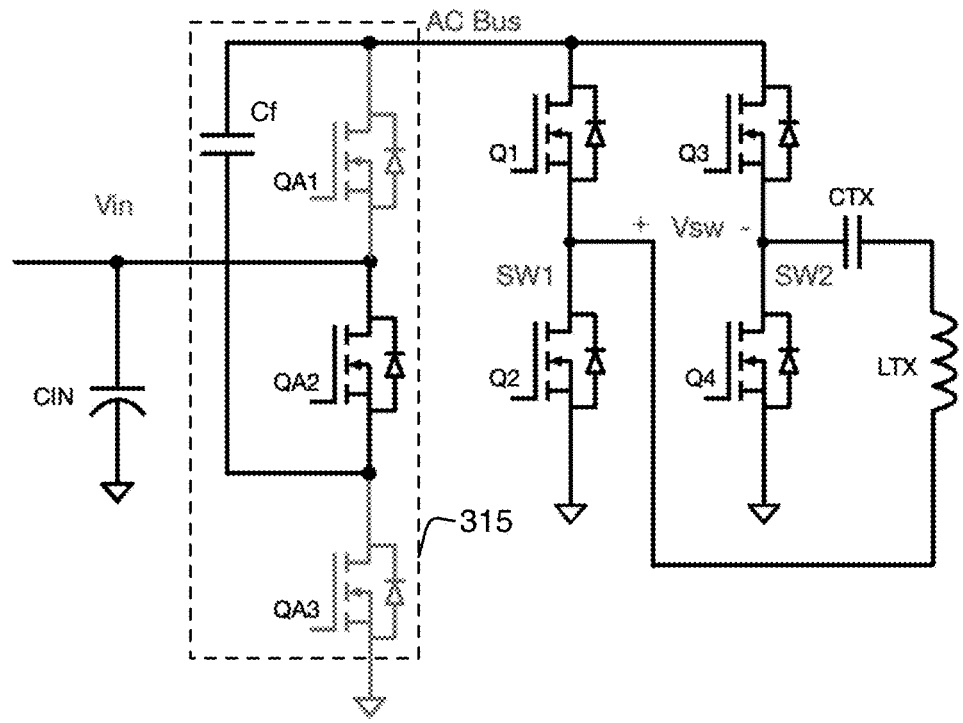
FIGS. 4A-4B illustrates alternate operating states or modes of a two-step inverter.
Figure 4B:
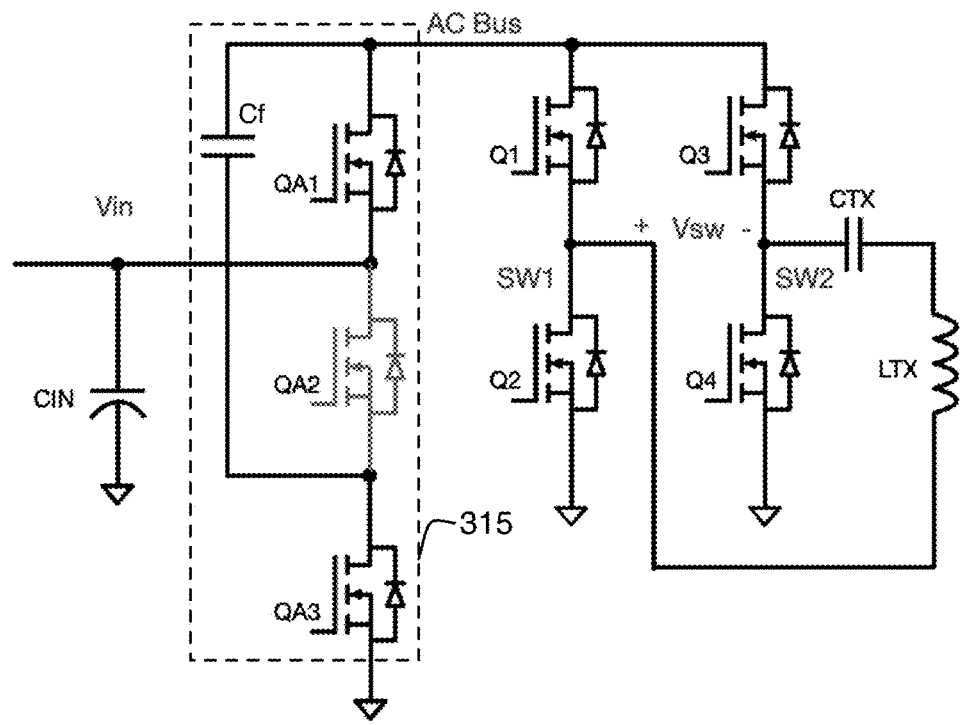

FIGS. 4A-4B illustrates alternate operating states or modes of switched capacitor stage 315 of two-step inverter 314. FIG. 4A illustrates a "series mode" in which the AC bus voltage is equal to twice the input voltage Vin (i.e., the AC bus voltage is 2*Vin). This is achieved because the flying capacitor Cf is coupled in series with the input voltage by closing switch QA2 and opening switches QA1 and QA3. In the series mode flying capacitor Cf is discharging to the AC bus, having been previously charged to the input voltage Vin during the "parallel mode, illustrated in FIG. 4B. In the parallel mode, switches QA1 and QA3 are closed and switch QA2 is open. Thus, the switching states as between the series mode of FIG. 4A and the parallel mode of FIG. 4B may be said to be complementary in that the states of each switch are the complement of the same switch's state in the alternate mode. The parallel mode of FIG. 4B results in the input voltage Vin being coupled across both flying capacitor Cf and to the AC bus. Thus, in the parallel mode, the AC bus voltage is equal to the input voltage Vin, and flying capacitor Cf is being charged by the input voltage.

Figure 5:
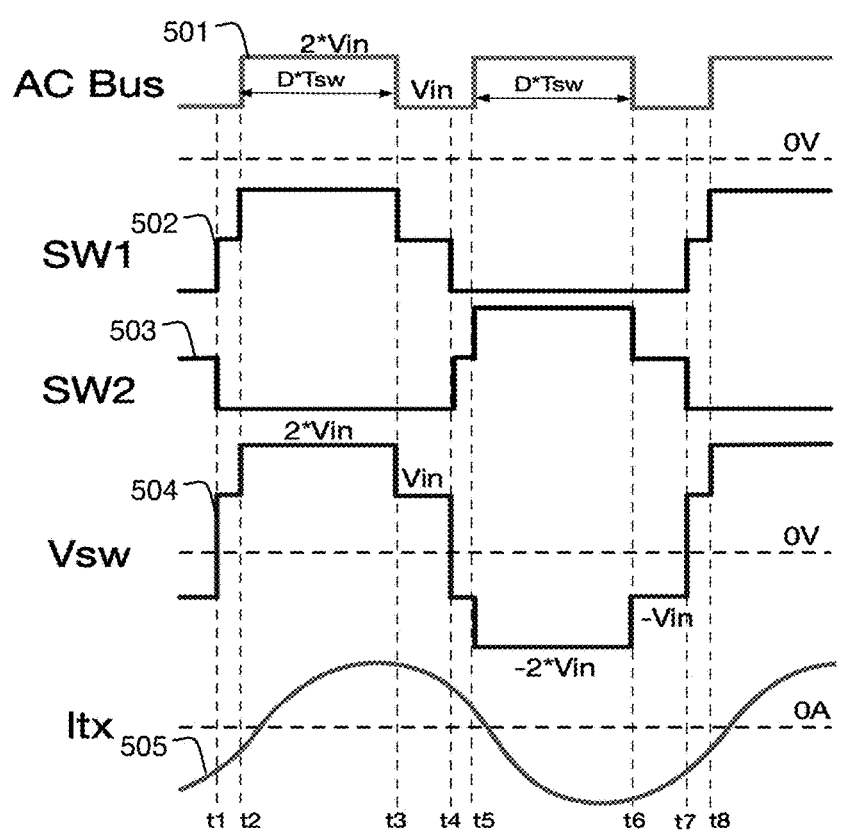
FIG. 5 illustrates various waveforms of the two-step inverter of FIG. 3.

FIG. 5 illustrates various waveforms of the two-step inverter of FIG. 3. The waveforms cover a complete cycle of the inverter, beginning at time t1 and ending at time t7. The PTx inverter control circuitry (e.g., controller/communications module 116) can implement a dual edge control scheme for the switching devices QA1-QA3 of switched capacitor stage 315. More specifically, as described above the switched capacitor stage 315 can be operated in the parallel mode to provide an AC bus voltage that is equal to the input voltage (Vin) or operated in the series mode to provide an AC bus voltage that is equal to twice the input voltage (i.e., 2*Vin). Thus, as illustrated by AC bus voltage waveform 501, the AC bus voltage can alternate between Vin and 2*Vin. The width of the 2*Vin portion of AC bus voltage waveform 501 may be controlled by varying the duty cycle D of the switched capacitor converter switches. The width of the Vin portion of the AC bus waveform will then be (1−D)*Tsw. Also, waveform 501 illustrates that, as noted above, the switched capacitor converter stage 315 operates at a switching frequency that is twice the inverter switching frequency, i.e, there are two cycles of the AC bus voltage waveform 501 that is the output of the switched capacitor stage 315 for each cycle of the inverter.

Switching of the inverter stage switches are illustrated by the SW1 voltage waveform 502 and the SW2 voltage waveform 503. As noted above these are the voltages, relative to ground, of nodes SW1 and SW2 at the mid-point of the respective inverter legs. Waveform 504 depicts Vsw, which is the difference between the SW1 and SW2 voltages. The switching cycle begins at time t1, at which point inverter switches Q3 and Q2 may be turned off, with inverter switches Q1 and Q4 turned on. Concurrently, switched capacitor converter switches QA1 and QA3 are turned on, with QA2 turned off, corresponding to the parallel mode. Thus, as seen in AC bus waveform 501, beginning at time t1 until the next switching transition at time t2, the AC bus voltage is equal to the input voltage Vin. As shown in waveform 502, the SW1 node voltage is at Vin because switch Q1 is turned on, coupling SW1 to the AC bus. As shown in waveform 502, the SW2 node voltage is at zero because switch Q4 is turned on coupling SW2 to ground.

Subsequently, at time t2, switches QA1 and QA3 turn off. This causes the rising edge transition of the AC bus voltage waveform 501 from Vin to 2*Vin. More specifically, at time t2, the inverter current Itx is negative (as illustrated by waveform 505), which ramps the AC bus voltage from Vin to 2*Vin through the body diode of switch QA2. Thus, switch QA2 can be turned on after a short dead time to allow zero voltage switching, reducing switching losses and increasing operating efficiency. This dead time between turning off switches QA1 and QA3 and the turning on switch QA2 should not be interpreted as inconsistent with the complementary nature of their switching as described above. As a result of the above-described switching transitions, beginning at (or shortly after) time t2 until the next switching transition at time t3, the voltage at node SW1 is equal to 2*Vin (as illustrated by waveform 502), and the voltage at node SW2 remains at 0 (as illustrated by waveform 503). Thus, the inverter output voltage Vsw increases to 2*Vin (as illustrated by waveform 504), and the inverter output current Itx continues increasing, eventually becoming positive.

Thereafter, at time t3, switch QA2 turns off. This causes the falling edge transition of the AC bus voltage waveform 501 from 2*Vin to Vin. More specifically, at time t3, the inverter current Itx is positive (as illustrated by waveform 505), which ramps the AC bus voltage from 2*Vin to Vin through the body diodes of switches QA1 and QA3. Thus, switches QA1 and QA3 can be turned on after a short dead time to allow zero voltage switching, reducing switching losses and increasing operating efficiency. This dead time between turning off switch QA2 and turning on switches QA1 and QA3 should not be interpreted as inconsistent with the complementary nature of their switching as described above. As a result of the above-described switching transitions, beginning at (or shortly after) time t3 until the next switching transition at time t4, the voltage at node SW1 is equal to Vin (as illustrated by waveform 502), and the voltage at node SW2 remains at 0 (as illustrated by waveform 503). Thus, the inverter output voltage decreases to Vin (as illustrated by waveform 504), and the inverter output current ITx begins decreasing.

At time t4, the first half cycle of the inverter operation ends with turning off switches Q1 and Q4 and turning on switches Q2 and Q3 shortly thereafter (i.e., with a short dead time). The negative half cycle then proceeds substantially as described above, except that the node voltages SW1 and SW2 are reversed by virtue of the Q1-Q4 to Q2-Q3 transition. The above-described operation requires a minimum duration of the parallel mode of switching converter 315 to ensure suitable charging and discharging of flying capacitor Cf. For example, over a half cycle it might be necessary for the parallel mode, corresponding to the interval t1-t2 and t3-t4 to include about 20% of the overall cycle time, such that the series mode, corresponding to interval t2-t3 can only be about 30% of the overall cycle time. These values are exemplary only and can be adjusted within some limited tolerance around these ranges by selection of the operating frequency, flying capacitor value, operating voltages, and other variables. In any case, this limitation on flying capacitor charge/discharge time may mean that the topology of FIG. 3 can be more easily employed in relatively lower power applications.

Summarized another way, as can be seen with reference to AC bus voltage 501, the flying capacitor stage may be operated in an alternating manner during each cycle (t1-t4 and t4-t7) of the switched capacitor switching period Tsw to alternate between providing a voltage of 2*Vin to the AC bus for a period equal to a duty cycle "D" multiplied by the switching period of the switched capacitor stage Tsw. As described above, this duty cycle can be varied to regulate power delivered by the inverter. During a second period to (1−D) multiplied by the switching period, an input voltage Vin can be provided to the AC bus. The total inverter switching period is 2*Tsw and corresponds to the interval from t1-t7, with an inverter half cycle corresponding to the time period from t1-t4 and t4-t7 as described above. The inverter switches may commutate from the positive half cycle (switches Q1 and Q4 closed with switches Q2 and Q3 open) to the negative half cycle (switches Q1 and Q4 open with switches Q2 and Q3 closed) at the midpoint of the inverter switching period, i.e., time t4.

Figure 6:
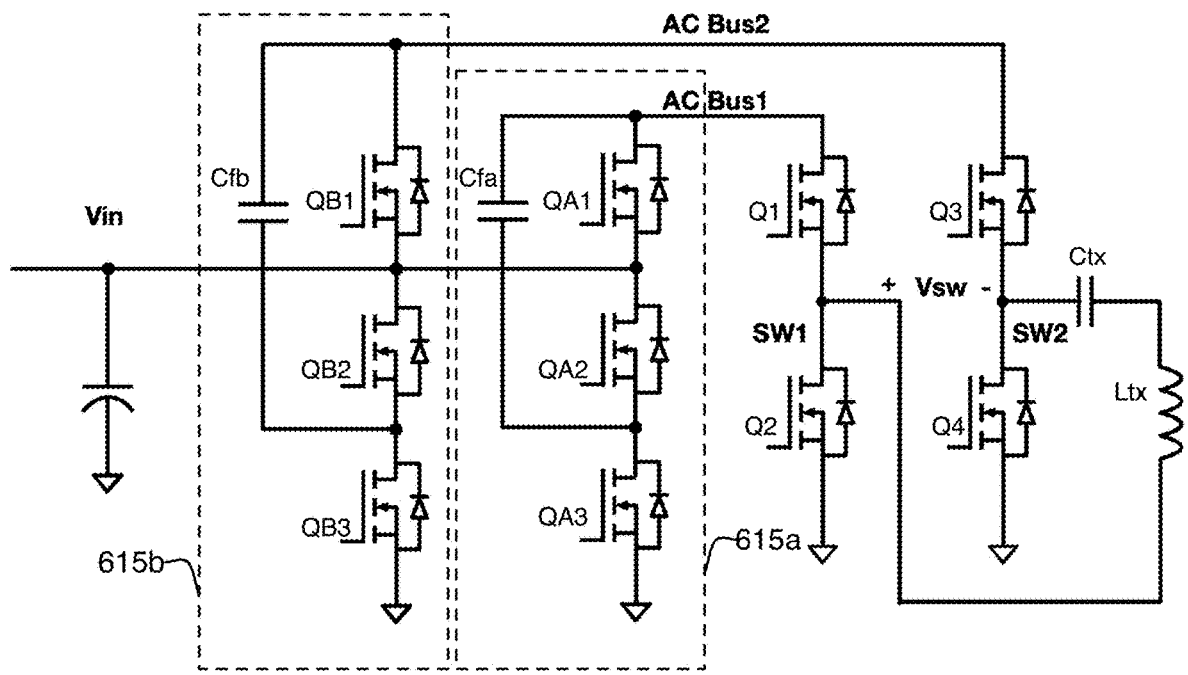
FIG. 6 illustrates a simplified schematic of a wireless power transmitter incorporating an alternative embodiment of a two-step inverter.

FIG. 6 illustrates a simplified schematic of a wireless power transmitter incorporating an alternative embodiment of a two-step inverter. The wireless power transmitter of FIG. 6 includes two switched capacitor stages. A first switched capacitor stage 615a has as its output AC Bus 1, which is coupled to the first inverter leg made up of switches Q1 and Q2. A second switched capacitor stage 615b has as its output AC Bus 2, which is coupled to the second inverter leg made up of switches Q3 and Q4. In all other respects, the circuit can be constructed as described above with respect to FIG. 3. The presence of two switched capacitor stages with separate output AC busses can address the issues described above with respect to maximum power transfer capability due to the time required to charge the flying capacitors. More specifically, the respective switched capacitor stages 615a and 615b may be operated in an interleaved fashion, as described in greater detail below with respect to FIG. 7. This can allow for longer flying capacitor charging intervals, as the flying capacitor of one stage can be charging for essentially the whole time that the flying capacitor of the alternate stage is discharging and vice-versa. In other words, one switched capacitor stage can be operated in the parallel mode (charging the flying capacitor) while the other switched capacitor stage is operated in the series mode (discharging the flying capacitor).

Figure 7:
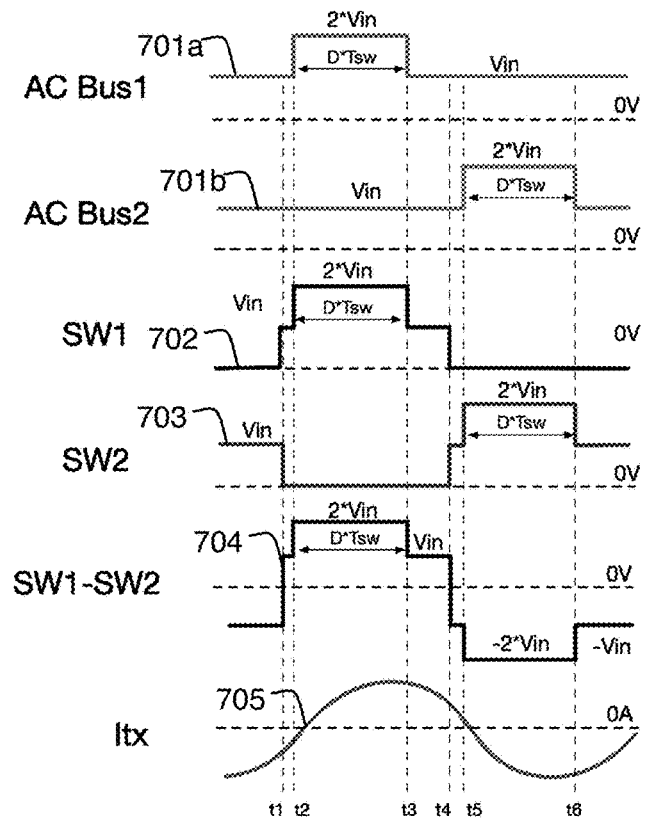
FIG. 7 illustrates various waveforms of the two-step inverter of FIG. 6.

FIG. 7 illustrates various waveforms of the two-step inverter of FIG. 6. The waveforms cover a complete cycle of the inverter, beginning at time t1 and ending after time t6. The PTx inverter control circuitry (e.g., controller/communications module 116) can implement a dual edge control scheme for the switching devices QA1-QA3 of first switched capacitor stage 615a and for the switching devices QB1-QB3 of second switched capacitor stage 615b. More specifically, as described above, one switched capacitor stages can be operated in the parallel mode to provide an AC bus voltage that is equal to the input voltage (Vin) while charging its flying capacitor or operated in the series mode to provide an AC bus voltage that is equal to twice the input voltage (i.e., 2*Vin) while discharging its flying capacitor. Thus, as illustrated by AC Bus 1 voltage waveform 701a, the AC Bus 1 voltage can alternate between Vin and 2*Vin (being 2*Vin during the t2-t3 interval). Similarly, as illustrated by AC Bus 2 voltage waveform 701b, the AC Bus 2 voltage can alternate between Vin and 2*Vin (being 2*Vin during the t5-t6 interval). The width of the 2*Vin portion of both AC bus voltage waveforms 701a and 701b may be controlled by varying the duty cycle D of the switched capacitor converter switches. The width of the Vin portion of the AC bus waveform will then be (1−D)*Tsw. As noted, this provides substantial additional time for the parallel mode/flying capacitor charging as compared to the embodiment of FIG. 3, discussed above. Also, waveforms 701a and 701b illustrate that, as noted above, the switched capacitor converter stages 615a and 615b operate at a switching frequency that is equal to the inverter switching frequency.

Switching of the inverter stage switches is illustrated by the SW1 voltage waveform 702, the SW2 voltage waveform 703, and the SW1-SW2 voltage waveform 704, which is the difference between the SW1 and SW2 voltages. The switching cycle begins at time t1. Prior to time t1, each switching capacitor stage is in its parallel mode, corresponding to a switching state in which QA1, QA3, QB1, and QB3 are closed. This presents a voltage of Vin on each AC bus. The inverter output voltage SW1-SW2 is at −Vin, meaning that switches Q2 and Q3 are turned on, and Q1 and Q4 are turned off. Then, at time t1, switches Q2 and Q3 are turned off, and, after a short dead time, switches Q1 and Q4 are turned on, causing SW1-SW2 to transition to +Vin.

Subsequently, at time t2, switched capacitor stage 615a transitions to the series mode by opening switches QA1 and QA3, and, after a short dead time, closing switch QA2. This causes the AC Bus 1 voltage 701a to transition to 2*Vin and causes the inverter output voltage SW1-SW2/704 to transition to +2*Vin. This state persists until time t3, at which point switched capacitor stage 615a transitions back to the parallel mode by opening switch QA2 and, after a short dead time, closing switches QA1 and QA2. This causes the inverter output voltage SW1-SW2/704 to transition back to +Vin. Subsequently, at time t4, the inverter changes states, opening switches Q1 and Q4 and, after a short dead time, closing switches Q2 and Q3, causing the inverter output voltage SW1-SW2/704 to transition from +Vin to −Vin.

Then, at time t5, switched capacitor stage 615b transitions to the series mode by opening switches QB and QB3, and, after a short dead time, closing switch QB2. This causes the AC Bus 2 voltage 701b to transition to 2*Vin and causes the inverter output voltage SW1-SW2/704 to transition to −2*Vin. This state persists until time t6, at which point switched capacitor stage 615b transitions back to the parallel mode by opening switch QB2 and, after a short dead time, closing switches QB1 and QB2. This causes the inverter output voltage SW1-SW2/704 to transition back to −Vin.

Summarized another way, as can be seen with reference to AC bus voltages 701a/701b, the flying capacitor stages may be operated in an alternating manner during each cycle of the inverter/switched capacitor switching period Tsw to alternate between providing a voltage of 2*Vin to the AC bus for a period equal to a duty cycle "D" multiplied by the switching period Tsw of the switched capacitor stages and the inverter stage. As described above, this duty cycle can be varied to regulate power delivered by the inverter. During a second period (1−D) multiplied by the switching period, an input voltage Vin can be provided to the AC bus. The total inverter switching period is Tsw and corresponds to the interval from t1 to after t6, with an inverter half cycle corresponding to the time period from t1-t4 and t4 to after t6 as described above. The inverter switches may commutate from the positive half cycle (switches Q1 and Q4 closed with switches Q2 and Q3 open) to the negative half cycle (switches Q1 and Q4 open with switches Q2 and Q3 closed) at the midpoint of the inverter switching period, i.e., time t4.

As described above with respect to FIGS. 3-5, the inverter output current Itx/705 can be used to achieve zero voltage switching for at least some of the above-described switching transitions.

Figure 8:
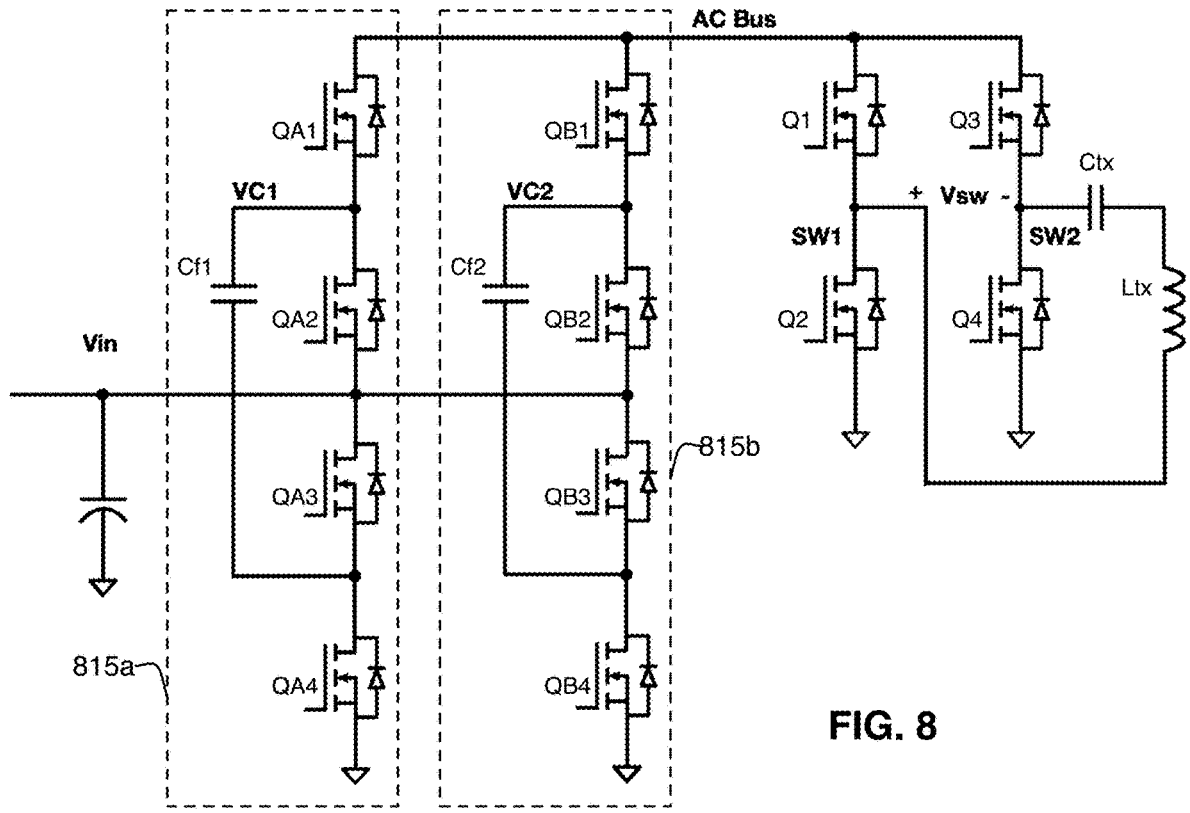
FIG. 8 illustrates a simplified schematic of a wireless power transmitter incorporating yet another alternative embodiment of a two-step inverter.

FIG. 8 illustrates a simplified schematic of a wireless power transmitter incorporating yet another alternative embodiment of a two-step inverter. In the illustrated embodiment, there are two switched capacitor stages 815a and 815b, as described above with respect to FIG. 6. However, unlike that embodiment, the two switched capacitor stages 815a and 815b are coupled to a common AC bus, like in the embodiment of FIG. 3. Also, each switched capacitor stage has an additional top switch QA1/QB1 that allows for the switched capacitor stage to operate at a frequency that is independent of the inverter switching frequency. Otherwise, switches QA2-QA4 and QB2-QB4 operate in a manner substantially like that of switches QA1-QA3 as described above with respect to FIG. 3, except that the operating frequency may be different than the inverter switching frequency. In some embodiments, the switched capacitor stages 815a and 815b may be operated at a frequency that is higher than the inverter switching frequency. This can allow for a reduction in the physical size and capacitance values of the flying capacitors of the switched capacitor stages. The ratio between the operating frequencies as between the flying capacitor stages and the inverter stage can be determined as appropriate for a given application, but may range from relatively small multiples (e.g., on the order of about 2× to about 5× or more) to relatively higher values (e.g., on the order of 10×), to even substantially greater (e.g., on the order of 100× or more).

Figure 9:
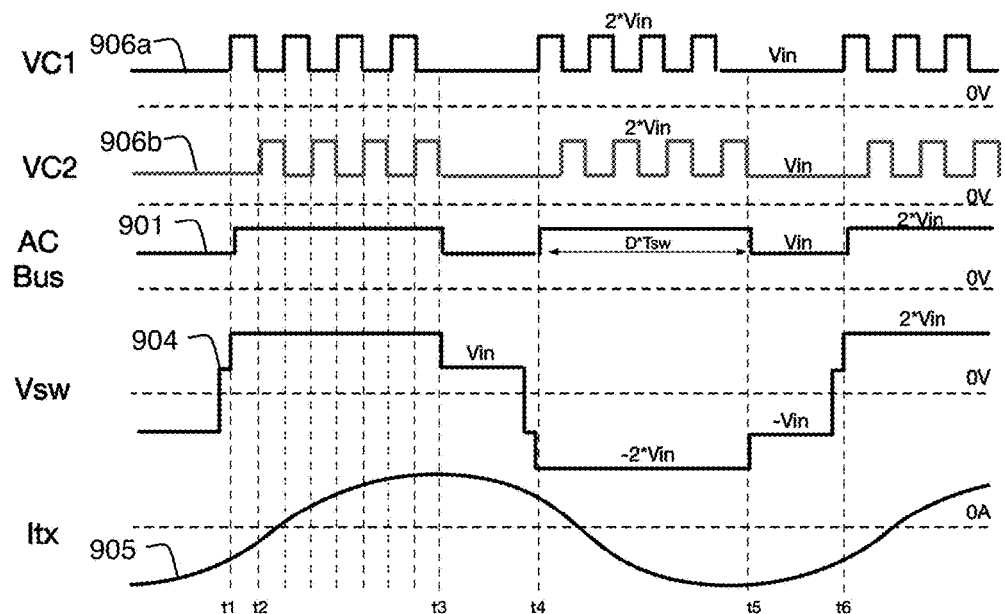
FIG. 9 illustrates various waveforms of the two-step inverter of FIG. 8.

FIG. 9 illustrates various waveforms of the two-step inverter of FIG. 8. Voltage waveforms VC1/906a and VC2/906b correspond to the voltages of switching nodes of flying capacitors Cf1 junction with QA1 and Cf2 junction with QB1, respectively, which are controlled by switching of switches QA1-QA4 and switches QB1-QB4, respectively. As illustrated, the switching converters operate at a higher frequency than the inverter switches, as evidenced by the multiple voltage pulses of the VC1/VC2 waveforms as compared to the AC bus voltage waveform 901, the inverter output voltage Vsw waveform 904, and the inverter current waveform 905. For each switching converter stage, the flying capacitor can be charged from the input voltage Vin by closing switches Qx2 and Qx4 (where x is A for first switched capacitor stage 815a and B for switched capacitor stage 815b). The charging flying capacitor may be selectively coupled to or decoupled from the AC bus by closing or opening switch Qx1. In either case, switch Qx3 will be open in the flying capacitor charging mode. The flying capacitor can be discharged to the AC bus in series with the input voltage by closing switches Qx1 and Qx3, with switches Qx2 and Qx4 open.

As can be seen with reference to flying capacitor Cf1 switching node voltage VC1/906a, flying capacitor Cf2 switching node voltage VC2/906b, and AC bus voltage 901, the two flying capacitor stages may be operated in an interleaved manner during time period t1-t3 to alternate between providing a voltage of 2*Vin to the AC bus for a period equal to a duty cycle "D" multiplied by the switching period of the inverter Tsw. As described above, this duty cycle can be varied to regulate power delivered by the inverter. During a second period to (1−D) multiplied by the switching period, an input voltage Vin can be provided to the AC bus. The total inverter switching period Tsw corresponds to the interval from t1-t6, with an inverter half cycle corresponding to the time period from t1-t4. The inverter switches may commutate from the positive half cycle (switches Q1 and Q4 closed with switches Q2 and Q3 open)

to the negative half cycle (switches Q1 and Q4 open with switches Q2 and Q3 closed) at the midpoint of the switching period, i.e., time t4.

As described above with respect to FIGS. 3-5, the inverter output current Itx/905 can be used to achieve zero voltage switching for at least some of the above-described switching transitions.

Figure 10C:
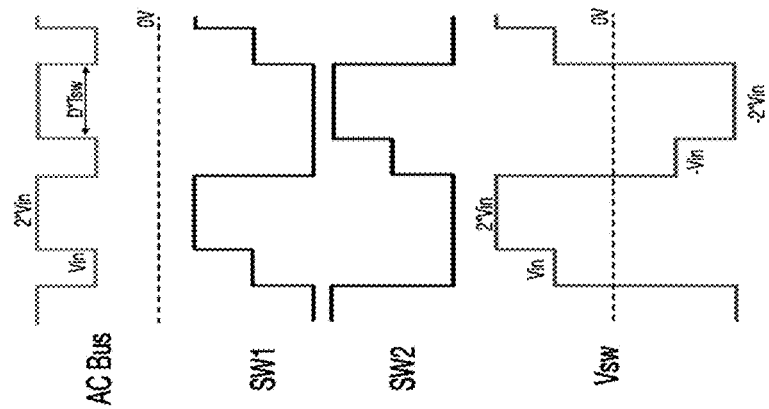
FIGS. 10A-10F illustrate various switching/control schemes for the two-step inverters described herein.
Figure 10B:
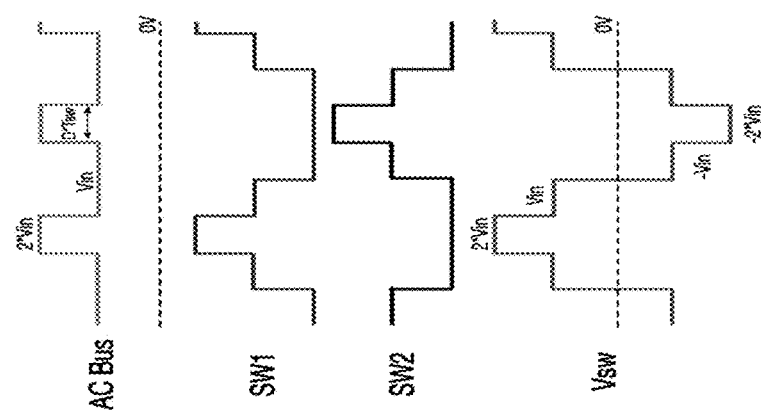
Figure 10A:
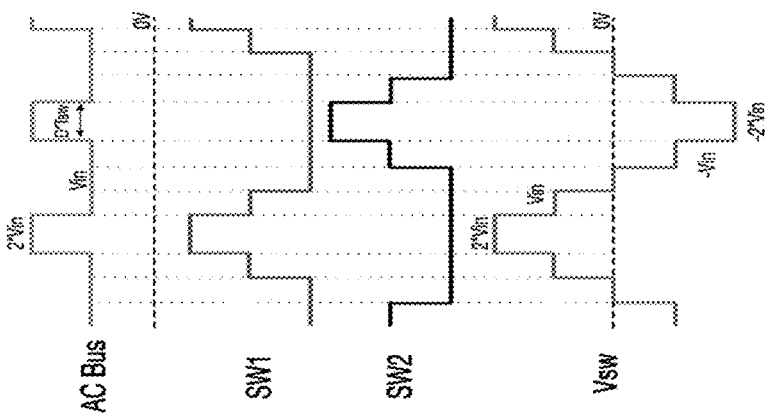

FIGS. 10A-10F illustrate various switching/control schemes for the two-step inverters described herein. Each control scheme is depicted based on examples of the various waveforms discussed above with respect to FIGS. 5, 7, and 9. FIGS. 10A-10D are applicable to any of the various two-step inverter topologies described above. FIG. 10A illustrates a three-level control scheme in which the AC bus voltage operates between two voltage levels Vin and 2*Vin, and the inverter switches are commutated to provide output voltage levels of 0, Vin, 2*Vin, −Vin, and −2*Vin. The width of the 2*Vin portion of the pulses can be controlled by controlling the duty cycle of the switched capacitor stage. The timing and positioning of the inverter stage output voltage levels can be achieved by varying the phase shift between switching events of the switched capacitor stage(s) and the inverter stage. FIG. 10B illustrates a dual-edge control scheme and was discussed in greater detail above with respect to FIG. 5. In the dual-edge control scheme, the inverter switches are commutated to provide output voltage levels of Vin, 2*Vin, −Vin, and −2*Vin (with no zero-voltage level). The width of the 2*Vin portion of the pulses can be controlled by controlling the duty cycle of the switched capacitor stage. The timing and positioning of the inverter stage output voltage levels can be achieved by varying the phase shift between switching events of the switched capacitor stage(s) and the inverter stage. In each of these schemes, the transition from +/−Vin to +/−2*Vin occurs on both the leading edge and falling edge of the inverter output voltage waveforms.

FIG. 10C illustrates a leading-edge control scheme in which the +/−Vin to +−/2*Vin transition occurs on the leading edge of the inverter output voltage waveform and the falling edge features a +2*Vin to −Vin or −2*Vin to +Vin transition. The width of the 2*Vin portion of the pulses can be controlled by controlling the duty cycle of the switched capacitor stage. The timing and positioning of the inverter stage output voltage levels can be achieved by varying the phase shift between switching events of the switched capacitor stage(s) and the inverter stage. FIG. 10D illustrates a falling-edge control scheme in which the +/−Vin to +−/2*Vin transition occurs on the falling edge of the inverter output voltage waveform and the leading-edge features a −Vin to +2*Vin or +Vin to −2*Vin transition. The width of the 2*Vin portion of the pulses can be controlled by controlling the duty cycle of the switched capacitor stage. The timing and positioning of the inverter stage output voltage levels can be achieved by varying the phase shift between switching events of the switched capacitor stage(s) and the inverter stage. This falling edge control scheme can provide for enhanced ZVS performance in some embodiments.

Figure 10F:
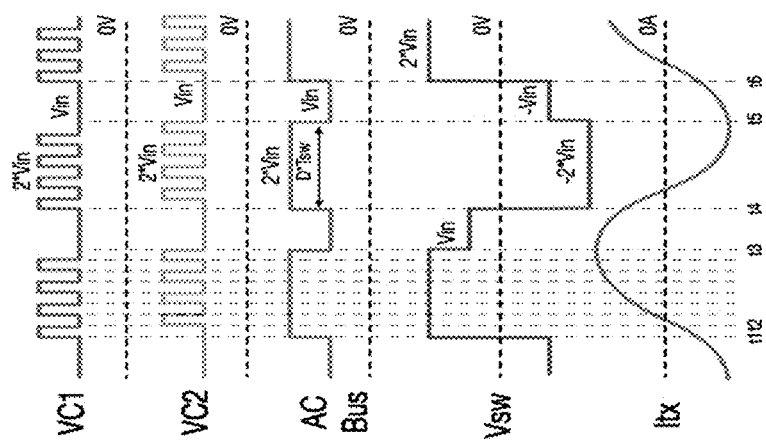
Figure 10E:
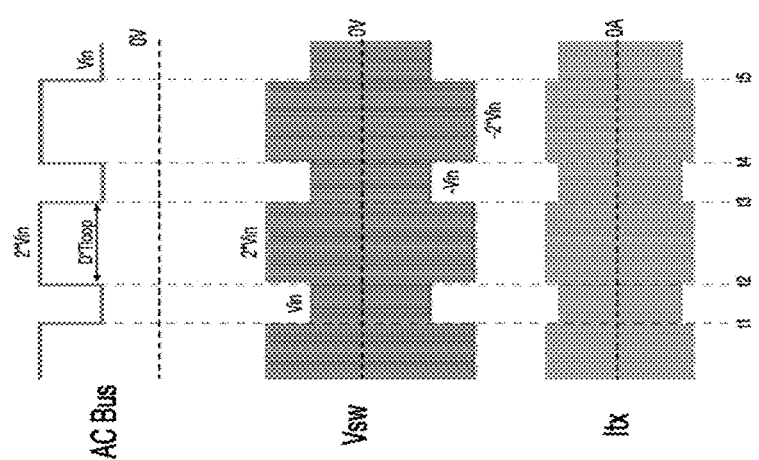
Figure 10D:
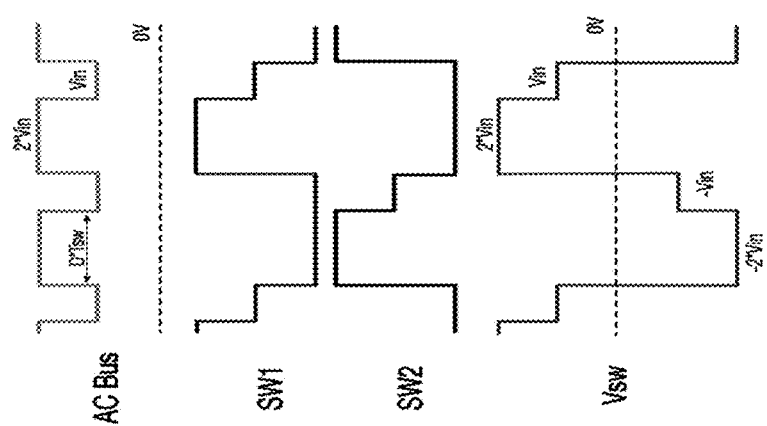

FIGS. 10E-10F are applicable to the two-step inverter topologies like those described with respect to FIG. 8, in which the fourth switch at the top of the switched capacitor stage allows the switched capacitor stage frequency to be independent of the inverter switching frequency. FIG. 10E depicts a switching arrangement in which the inverter stage operates with a higher frequency than the switched capacitor stage. FIG. 10F depicts a switching arrangement in which the switched capacitor stage operates with a higher frequency than the inverter stage (as was described with respect to FIG. 9). In addition to the high frequency switched capacitor stage configuration, FIG. 10F also depicts a falling edge control scheme.

Described above are various features and embodiments relating to wireless power transfer transmitters incorporation two-step inverters. Such arrangements may be used in a variety of applications but may be particularly advantageous when used in conjunction with electronic devices such as mobile phones, tablet computers, laptop or notebook computers, and accessories, such as wireless headphones, styluses, etc. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that may be able to transmit certain information amongst the PTx and PRx in the system. The present disclosure contemplates this passage of information improves the devices' ability to provide wireless power signals to each other in an efficient manner to facilitate battery charging, such as by sharing of the devices' power handling capabilities with one another. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system and allow users to "opt in" or "opt out" of participation. For instance, such information may be presented to the user when they place a device onto a power transmitter, if the power transmitter is configured to poll for sensitive information from the power receiver.

Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The invention claimed is:
1. A switched capacitor converter comprising:
a switched capacitor stage comprising a flying capacitor and a ladder of three switching devices wherein:
a first switching device is connected between a DC input of the switched capacitor converter and an AC bus, a second switching device is connected between the DC input and a third switching device; and the third switching device is connected between the second switching device and ground;

wherein the flying capacitor is connected between the AC bus and a junction of the second switching device and the third switching device; and an inverter stage having an input coupled to the AC bus and an output that delivers an AC voltage.

2. The switched capacitor converter of claim 1 further comprising control circuitry that operates the switched capacitor stage to alternate between:

a parallel mode in which the flying capacitor is connected in parallel with the DC input by closing the first and third switching devices and opening the second switching device, thereby supplying an input voltage received at the DC input to the inverter stage via the AC bus; and a series mode in which the flying capacitor is connected in series with the DC input by opening the first and third switching devices and closing the second switching device, thereby supplying twice the input voltage received at the DC input to the inverter stage via the AC bus.

3. The switched capacitor converter of claim 2 wherein the control circuitry switches between the parallel mode and the series mode at a frequency twice the switching frequency of the inverter stage.

4. The switched capacitor converter of claim 3 wherein the control circuitry varies a duty cycle between the parallel mode and the series mode to regulate an output voltage or current of the inverter stage.

5. The switched capacitor converter of claim 4 wherein the control circuitry varies a phase shift between switching of the switched capacitor stage and switching of the inverter stage to control timing and positioning inverter stage output voltage levels.

6. The switched capacitor converter of claim 4 wherein:

the switched capacitor stage comprises first and second switched capacitor stages, the first switched capacitor stage being coupled to a first AC bus and a second switched capacitor stage being coupled to the second AC bus; and the inverter stage comprises a full bridge inverter having a first leg coupled to the first AC bus and a second leg coupled to the second AC bus.

7. The switched capacitor converter of claim 6 further comprising control circuitry that operates the first and second switched capacitor stages to alternate between:

a parallel mode in which a respective flying capacitor is connected in parallel with the DC input by closing corresponding first and third switching devices and opening a corresponding second switching device, thereby supplying an input voltage received at the DC input to the inverter stage via a respective AC bus; and a series mode in which a respective flying capacitor is connected in series with the DC input by opening corresponding first and third switching devices and closing a corresponding second switching device, thereby supplying twice the input voltage received at the DC input to the inverter stage via a respective AC bus;

wherein the first switched capacitor stage is in the series mode when the second switched capacitor stage is in the parallel mode, and the second switched capacitor stage is in the series mode when the first switched capacitor stage is in the parallel mode.

8. The switched capacitor converter of claim 7 wherein the control circuitry switches the first and second switched capacitor stages between the parallel mode and the series mode at a frequency equal to the switching frequency of the inverter stage.

9. The switched capacitor converter of claim 8 wherein the control circuitry varies a duty cycle between the parallel mode and the series mode to regulate an output voltage or current of the inverter stage.

10. The switched capacitor converter of claim 9 wherein the control circuitry varies a phase shift between switching of the switched capacitor stage and switching of the inverter stage to control timing and positioning inverter stage output voltage levels.

11. The switched capacitor converter of claim 1 wherein the switched capacitor stage comprises a first switched capacitor stage and a second switched capacitor stage, each of the first and second switched capacitor stages further comprising an additional switching device selectively coupling a respective flying capacitor and a respective first switching device to the AC bus.

12. The switched capacitor converter of claim 11 further comprising control circuitry that operates the first and second switched capacitor stages to alternate between:

a parallel mode in which a respective flying capacitor is connected in parallel with the DC input by closing corresponding first and third switching devices and opening a corresponding second switching device, thereby supplying an input voltage received at the DC input to the inverter stage via a respective AC bus; and a series mode in which a respective flying capacitor is connected in series with the DC input by opening corresponding first and third switching devices and closing a corresponding second switching device, thereby supplying twice the input voltage received at the DC input to the inverter stage via a respective AC bus;

wherein the first switched capacitor stage is in the series mode when the second switched capacitor stage is in the parallel mode, and the second switched capacitor stage is in the series mode when the first switched capacitor stage is in the parallel mode.

13. The switched capacitor converter of claim 12 wherein the control circuitry switches the first and second switched capacitor stages between the parallel mode and the series mode at a frequency independent from the switching frequency of the inverter stage.

14. The switched capacitor converter of claim 13 wherein the switching frequency of the first and second switched capacitor stages is greater than the switching frequency of the inverter stage.

15. The switched capacitor converter of claim 13 wherein the control circuitry varies a duty cycle between the parallel mode and the series mode to regulate an output voltage or current of the inverter stage.

16. The switched capacitor converter of claim 15 wherein the control circuitry varies a phase shift between switching of the switched capacitor stage and switching of the inverter stage to control timing and positioning inverter stage output voltage levels.

17. A wireless power transmitter comprising an switched capacitor converter according to claim 1, wherein the output of the inverter stage is coupled to a wireless power transmitter coil.

18. A switched capacitor converter comprising:

a first switched capacitor stage further comprising a first flying capacitor stage and a ladder of three switching devices wherein a first switching device of the first flying capacitor stage is connected between a DC input of the switched capacitor converter and a first AC bus, a second switching device of the first flying capacitor stage is connected between the DC input and a third switching device of the first flying capacitor stage, and the third switching device of the first switched capacitor stage is connected between the second switching device of the first switched capacitor stage and ground, and the first flying capacitor is connected between the first AC bus and a junction of the second switching device of the first flying capacitor stage and the third switching device of the first flying capacitor stage;

a second switched capacitor stage further comprising a second flying capacitor stage and a ladder of three switching devices wherein a first switching device of the second flying capacitor stage is connected between a DC input of the switched capacitor converter and a second AC bus, a second switching device of the second flying capacitor stage is connected between the DC input and a third switching device of the second flying capacitor stage, and the third switching device of the second switched capacitor stage is connected between the second switching device of the second switched capacitor stage and ground, and the second flying capacitor is connected between the second AC bus and a junction of the second switching device of the second switched capacitor stage and the third switching device of the second switched capacitor stage; and an inverter stage further comprising a full bridge inverter having a first leg coupled to the first AC bus and a second leg coupled to the second AC bus and an output that delivers an AC voltage.

19. The switched capacitor converter of claim 18 further comprising control circuitry that operates the first and second switched capacitor stages to alternate between:
   a parallel mode in which a respective flying capacitor is connected in parallel with the DC input by closing corresponding first and third switching devices and opening a corresponding second switching device, thereby supplying an input voltage received at the DC input to the inverter stage via a respective AC bus; and
   a series mode in which a respective flying capacitor is connected in series with the DC input by opening corresponding first and third switches and closing a corresponding second switching device, thereby supplying twice the input voltage received at the DC input to the inverter stage via a respective AC bus;
   wherein the first switched capacitor stage is in the series mode when the second switched capacitor stage is in the parallel mode, and the second switched capacitor stage is in the series mode when the first switched capacitor stage is in the parallel mode.

20. The switched capacitor converter of claim 19 wherein the control circuitry switches the first and second switched capacitor stages between the parallel mode and the series mode at a frequency equal to the switching frequency of the inverter stage.

21. The switched capacitor converter of claim 20 wherein the control circuitry varies a duty cycle between the parallel mode and the series mode to regulate an output voltage or current of the inverter stage.

22. The switched capacitor converter of claim 21 wherein the control circuitry varies a phase shift between switching of the first and second switched capacitor stages and switching of the inverter stage to control timing and positioning inverter stage output voltage levels.

23. A switched capacitor converter comprising:
   a first switched capacitor stage further comprising:
      a first flying capacitor stage and a ladder of four switching devices wherein: a first switching device of the first flying capacitor stage is connected between a first terminal of the first flying capacitor and a second switching device of the first flying capacitor stage, the second switching device of the first flying capacitor stage is coupled between the first terminal of the first flying capacitor and a DC input of the switched capacitor converter, a third switching device of the first flying capacitor stage is coupled between the DC input of the switched capacitor converter and a second terminal of the first flying capacitor, and a fourth switching device of the first flying capacitor stage is coupled between the third switching device of the first flying capacitor stage and ground;
   a second switched capacitor stage further comprising:
      a second flying capacitor stage and a ladder of four switching devices wherein: a first switching device of the second flying capacitor stage is connected between a first terminal of the second flying capacitor and a second switching device of the second flying capacitor stage, the second switching device of the second flying capacitor stage is coupled between the first terminal of the second flying capacitor and the DC input of the switched capacitor converter, a third switching device of the second flying capacitor stage is coupled between the DC input of the switched capacitor converter and a second terminal of the second flying capacitor, and a fourth switching device of the second flying capacitor stage is coupled between the third switching device of the second flying capacitor stage and ground;
   an inverter stage having an input coupled to an AC bus and an output that delivers an AC voltage.

24. The switched capacitor converter of claim 23 further comprising control circuitry that operates the first and second switched capacitor stages to alternate between:
   a parallel mode in which a respective flying capacitor is connected in parallel with the DC input by closing corresponding first and third switching devices and opening a corresponding second switching device, thereby supplying an input voltage received at the DC input to the inverter stage via a respective AC bus; and
   a series mode in which a respective flying capacitor is connected in series with the DC input by opening corresponding first and third switching devices and closing a corresponding second switching device, thereby supplying twice the input voltage received at the DC input to the inverter stage via a respective AC bus;
   wherein the first switched capacitor stage is in the series mode when the second switched capacitor stage is in the parallel mode, and the second switched capacitor stage is in the series mode when the first switched capacitor stage is in the parallel mode.

25. The switched capacitor converter of claim 24 wherein the control circuitry switches the first and second switched capacitor stages between the parallel mode and the series mode at a frequency independent from the switching frequency of the inverter stage.

26. The switched capacitor converter of claim 25 wherein the switching frequency of the first and second switched capacitor stages is greater than the switching frequency of the inverter stage.

27. The switched capacitor converter of claim 25 wherein the control circuitry varies a duty cycle between the parallel mode and the series mode to regulate an output voltage or current of the inverter stage.

28. The switched capacitor converter of claim 27 wherein the control circuitry varies a phase shift between switching of the switched capacitor stage and switching of the inverter stage to control timing and positioning inverter stage output voltage levels.

* * * * *